United States Patent
Thakur et al.

(10) Patent No.: US 6,275,292 B1
(45) Date of Patent: Aug. 14, 2001

(54) REFLECTANCE METHOD FOR EVALUATING THE SURFACE CHARACTERISTICS OF OPAQUE MATERIALS

(75) Inventors: Randhir P. S. Thakur, San Jose, CA (US); Michael Nuttall, Meridian, ID (US); J. Brett Rolfson; Robert James Burke, both of Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/517,473

(22) Filed: Mar. 2, 2000

Related U.S. Application Data

(60) Division of application No. 09/175,061, filed on Oct. 19, 1998, now Pat. No. 6,195,163, which is a continuation-in-part of application No. 08/596,469, filed on Feb. 5, 1996, now Pat. No. 5,825,498.

(51) Int. Cl.⁷ .................................................. G01B 11/30
(52) U.S. Cl. ............................ 356/371; 356/51; 356/445; 250/339.07
(58) Field of Search ................................. 356/371, 448, 356/445–447, 237.1–237.5, 394, 369, 51; 250/559.4, 559.44, 339.07, 339.08

(56) References Cited

U.S. PATENT DOCUMENTS

| | | | |
|---|---|---|---|
| 3,867,041 | 2/1975 | Brown et al. | 356/448 |
| 4,278,353 | 7/1981 | Ostermayer, Jr. | 356/448 |
| 4,352,016 | 9/1982 | Duffy et al. | 250/358.1 |
| 4,352,017 | 9/1982 | Duffy et al. | 250/358.1 |
| 4,511,800 | 4/1985 | Harbeke et al. | 356/371 |
| 4,766,317 | 8/1988 | Harbeke et al. | 250/358.1 |
| 5,146,097 | 9/1992 | Fujiwara et al. | 356/446 |
| 5,543,924 | 8/1996 | Surowiec | 356/371 |
| 5,607,800 | 3/1997 | Ziger | 356/445 |
| 5,796,484 | * 8/1998 | Honma et al. | 356/371 |
| 5,825,498 | 10/1998 | Thakur et al. | 356/394 |
| 5,835,225 | * 11/1998 | Thakur | 356/381 |
| 5,850,288 | * 12/1998 | Honma et al. | 356/371 |
| 6,195,163 | * 2/2001 | Thakur et al. | 356/371 |

OTHER PUBLICATIONS

Rapid Characterization of Polysilicon Films by means of a UV Reflectometer, G. Harbeke, E. Meier, J.R. Sandercock, and M. Tgetgel of Laboratories RCA, Ltd., Zurich, and M.T. Duffy and R.A. Soltis of RCA Laboratories, Princeton, NJ, *RCA Review*, vol. 44, Mar. 1983.

* cited by examiner

*Primary Examiner*—Hoa Q. Pham
(74) *Attorney, Agent, or Firm*—Workman, Nydegger & Seeley

(57) ABSTRACT

Disclosed is a process for analyzing the surface characteristics of opaque materials. The method comprises in one embodiment the use of a UV reflectometer to build a calibration matrix of data from a set of control samples and correlating a desired surface characteristic such as roughness or surface area to the set of reflectances of the control samples. The UV reflectometer is then used to measure the reflectances of a test sample of unknown surface characteristics. Reflectances are taken at a variety of angles of reflection for a variety of wavelengths, preferably between about 250 nanometers to about 400 nanometers. These reflectances are then compared against the reflectances of the calibration matrix in order to correlate the closest data in the calibration matrix. By so doing, a variety of information is thereby concluded, due to the broad spectrum of wavelengths and angles of reflection used. This includes information pertaining to the roughness and surface area, as well as other surface characteristics such as grain size, grain density, grain shape, and boundary size between the grains. Surface characteristic evaluation can be conducted in-process in a manner which is non-destructive to the test sample. The method is particularly useful for determining the capacitance of highly granular polysilicon test samples used in the construction of capacitor plates in integrated circuit technology, and can be used to determine the existence of flat smooth surfaces, and the presence of prismatic and hemispherical irregularities on flat smooth surfaces.

14 Claims, 8 Drawing Sheets

REFLECTANCE METHOD FOR EVALUATING THE SURFACE CHARACTERISTICS OF OPAQUE MATERIALS

RELATED APPLICATIONS

This is a divisional application of U.S. patent application Ser. No. 09/175,061, filed on Oct. 19, 1998 now U.S. Pat. No. 6,195,163, titled "Reflectance Method for Evaluating The Surface Characteristics of Opaque Materials", which is a continuation-in-part of U.S. patent application Ser. No. 08/596,469 now U.S. Pat. No. 5,825,498, titled "Ultraviolet Light Reflectance Method for Evaluating the Surface Characteristics of Opaque Materials", filed on Feb. 5, 1996, each of which are incorporated herein by reference.

BACKGROUND OF THE INVENTION

1. The Field of the Invention

The present invention relates to a method of evaluating the surface characteristics of opaque materials. More particularly, the present invention is directed to a method of evaluating qualitative and quantitative surface characteristics of a opaque film by measuring the intensity of reflectance therefrom across a spectrum of electromagnetic wavelengths, where measurements are taken with a reflectance detector at a plurality of reflectance angles.

2. The Relevant Technology

It has become desirable to measure or otherwise analyze surface characteristics such as the microscopic surface roughness of certain opaque materials during the fabrication of the opaque materials. An example of one material for which it is highly beneficial to measure surface characteristics is polycrystalline silicon (polysilicon). Polysilicon is used in the semiconductor manufacturing industry as a conductive layer and has significant advantages over other conductive materials in that it can withstand the high temperatures that are often required in subsequent manufacturing steps, and because it has the same electron affinity as single crystal silicon. Polysilicon is a solid material which is comprised of pure silicon crystallites or "grains" separated by grain boundaries. Consequently, the morphology of polysilicon is generally characterizable by the size of the individual crystals and the width of the grain boundaries that separate the crystals.

Polysilicon is typically formed as a film on silicon wafers in the process of manufacturing integrated circuits. Careful control of reactant gas flow, temperature, and pressure is required for consistent polysilicon film production. Within even these narrow parameters, however, the surface qualities of the polysilicon film can vary dramatically.

A recent development in polysilicon applications involves growing intentionally rough films for use as capacitor plates in integrated circuits. The roughness of the surface of these films serves as a means to increase the effective surface area of the capacitor plate while occupying a minimum of wafer space. When the polysilicon is grown with large grains, in the order of 60 nm or more, it is considered hemispherical grain polycrystalline silicon (HSG polysilicon). HSG polysilicon is preferred for other semiconductor manufacturing processes as well, and in each case must be deposited under the proper conditions to maximize its surface area.

HSG polysilicon is typically formed in one of two manners. In the first manner of polysilicon formation, the HSG polysilicon is formed by chemical vapor deposition with an appropriate chemistry, typically comprising silane in an appropriate chamber under certain predetermined process conditions. The second technique comprises depositing a planar smooth film of highly amorphous polysilicon which is appropriately doped with a seeding dopant such as phosphine, arsine or disilane. These dopants are then used as nucleation sites for forming grains within the crystalline structure of the polysilicon. The grains are formed during an anneal step during which the film surface rearranges itself into grains, providing a rough surface area.

Integrated circuits are currently grown in large batches, and inadvertent change of even one parameter of the HSG production process could reduce the surface area of the film to such a degree as to cause a failure condition. As an example, when an HSG polysilicon film being used to form capacitor plates is deposited under less than optimal conditions, the surface area of the capacitor plate may be insufficient, resulting in capacitors that fail to hold a charge sufficiently. When the capacitors are used to form a DRAM memory cell, for instance, the DRAM memory cell will as a result fail to meet refresh rates. A defect condition results which can reduce fabrication processing yield significantly.

Consequently, the precise control of polysilicon deposition is desirable to the preferable practice of semiconductor manufacturing processes. In order to maintain the necessary control over the manufacturing process, a method of evaluating the surface roughness of the HSG polysilicon is needed, both for process development and in-process monitoring. Furthermore, the method needs to be flexible, in order to meet the very different demands of both process development and in-process monitoring.

Process development requires a method that is accurate and dependable, and capable of providing detailed information as to specific surface characteristics, including at least surface roughness, grain size, and surface area. An in-process monitoring method need not necessarily provide highly detailed information, but should at least be able to determine when a variation in surface characteristics takes place. It should also be suitable to be conducted in-situ, and should not lower throughput.

Aluminum is a further example of a material for which a method of evaluating the surface characteristics is needed. In practice it has proven difficult to maintain the deposition parameters for aluminum at appropriate levels in order to result in a smooth surface of the deposited aluminum. In order to verify the smoothness of deposited aluminum and determine exactly how the parameters must be adjusted to maintain a smooth surface, a method for the in-process determination of the surface roughness of the aluminum is desirable.

The prior art has employed a number of methods for evaluating the surface characteristics of opaque materials. None of the prior art methods, however, has proven fully satisfactory for both product development and in-process evaluation of the surface characteristics of materials such as HSG polysilicon and aluminum.

One method previously used for analyzing surface characteristics of substrate materials is scanning electron microscopy (SEM). Using the SEM method, the sample is bombarded with electrons, and the electrons are then measured for surface characterization information as they return to the device. One limitation of this method is that the electrons do not penetrate deeply into the sample. Thus, SEM has proven helpful for analyzing lateral dimensions of surface roughness, but is very limited in analyzing vertical dimensions. Furthermore, SEM is generally destructive of the sample, has slow feedback times, and cannot be used in-process, during fabrication. It is also difficult to determine qualitative data about the sample using SEM. Furthermore, SEM cannot be used to determine precise grain size and surface area of highly granular samples. SEM analysis would be highly dependent upon the operator's judgment for such a characterization.

Another method previously used is atomic force microscopy (AFM). AFM utilizes a very small stylus, similar to a record needle. The stylus is scanned across the sample, back and forth over a small area, while a laser is reflected off of a platform located on the stylus. The deflection of the stylus is then measured by the variations in the returned laser light. The laser detector detects the reflected laser light, which is a direct result of the vertical movement of the stylus. This method provides very high resolution, even down to atomic resolution for certain samples, but has proven incapable of producing repeatable results. Furthermore, AFM is a very technical and demanding process, requiring highly-trained operators. AFM is also highly susceptible to environmental noise and surrounding vibrations. Additionally, the AFM contact method is somewhat destructive. While it does not destroy a whole wafer, it does destroy at least the part that is being tested. Thus, AFM has proven impractical for implementation on an in-process basis.

A further method previously used in the art is tunneling electron microscopy (TEM). Using TEM, a sample is prepared on a very thin slice of silicon, then electrons are bombarded through the sample. The density of the electrons are measured on the other side of the sample with a detector. The pattern the electrons make oil the detector as a result of the material that is being passed through is used to determine the size of the grains and their locations. This is also a very sensitive technique which can measure down to a very small feature size and can give calibrated results. Once again, however, the process is very time consuming, and involves a very high skill level of the operator. TEM is also a destructive method that cannot be conducted in-process.

A further method of surface evaluation is described in a paper entitled "Rapid Characterization of Polysilicon Films by Means of a UV Reflectometer" by G. Harbeke, E. Meir, J. R. Sandercock, M. Tjetjel, M. T. Duffy, and R. A. Soitis, RCA Review, Vol. 44, March 1983. Therein, a method of characterization of polysilicon films by means of a UV reflectometer is taught. The UV reflectometer is used to measure the reflectance of polysilicon on semiconductor wafers at one of two fixed wavelengths in the ultraviolet spectral region. Particularly, it measures the wavelengths at either 280 nm or at 400 nm, depending upon the application. The wavelength of 280 nanometers is used for in-process quality control of dust and defect detection. The wavelength of 400 nanometers, which has been found to probe to greater depths, is disclosed as being used to probe for bulk structural perfection in polycrystalline films.

The reflectometer uses a deuterium lamp, which provides a continuum light source. A chopper is used to alternately reflect light to a sensor from the sample and from blades on the chopper. The detector uses a silicon photovoltaic device with an enhanced UV response to detect the fraction of light reflected. The electrical signals from the detector are used to form a second signal which is normalized to the difference of the reflectance from the chopper minus the reflectance from the sample. The result is then plotted by reflectance and corresponds generally to surface smoothness and defect conditions.

This method has proven satisfactory for measuring surface defects and bulk characteristics of highly polished polysilicon films. Once again, however, sufficient information is not provided to characterize HSG polysilicon films. Such data from one of the wavelengths at 280 nm and 400 nm becomes somewhat inconsistent when the silicon passes a certain roughness, and provides only a moderate degree of information about the surface area of rougher films. Furthermore, no method of quantifying the raw reflectance data into useful information about surface characteristics is provided.

In order to better understand why the above method is inadequate for characterizing HSG polysilicon films, the graphical depictions of FIGS. 1 through 4 are provided. Therein are shown four different samples of HSG polysilicon. The sample of FIG. 1 has a relatively small grain size, uniform grains, and large boundary spaces between the grains. The sample of FIG. 2 is of a larger grain size and still of relative uniformity. In FIG. 3, an even larger grain size is depicted, with relatively uniform grains. FIG. 4 depicts a yet larger grain size, with somewhat irregularly shaped grains. The HSG polysilicon films graphically depicted in FIGS. 1 through 4 may be used, by way of example, as capacitor plates in integrated circuits.

The single wavelength method described above will detect a difference in reflectance between each of these samples, but has been found incapable of transforming that difference into a quantification of surface characteristics or of predicting surface area with a high degree of precision. This is due in part to the lack of information provided by each single wavelength about surface characteristics such as grain size, grain shape, grain density, and grain boundary size, all of which affect the total surface area and will effect the measured reflectance differently.

Thus, from the above discussion it can be seen that the need exists in the art for a method of evaluating the surface characteristics of opaque materials such as polysilicon films during process development. Furthermore, there is a need for a method of evaluating the surface characteristics of such materials which can be conducted in-process without destroying the sample, which can be conducted rapidly, and which can be conducted by operators that are not extensively trained. Such a method is particularly needed which is highly accurate in quantitatively determining particular surface characteristics such as surface area under varying parameters, and which can be used for opaque films of a high surface roughness.

SUMMARY OF THE INVENTION

The present invention seeks to resolve the above and other problems that have been experienced in the art. More particularly, the present invention constitutes an advancement in the art by providing a method for evaluating the surface characteristics of opaque materials with a reflection intensity detector and thereby quantitatively characterize the surface conditions of the opaque materials. By measuring the intensity of a reflected electromagnetic radiation (EMR), such as visible or invisible light, from a surface of an opaque material at different angles for a given angle of incident EMR, surface characteristics thereof can be derived, such as whether the surface is smooth, if it has prismatic irregularities, or if it has hemispherical irregularities.

The inventive method can be conducted ex situ for product development or in-process for production monitoring. A single wavelength or up to a full spectrum of ultraviolet wavelengths can be used. Additional information can also be learned about the surface characteristics of the opaque materials by changing the angle incidence and the angle of the reflection at which a intensity detector, such as a UV reflectometer, measures reflectance intensity.

The method of the present invention in one embodiment comprises the use of a UV reflectometer to measure the set of reflectances of a test sample of unknown surface characteristics covering a continuum of spectra and a plurality of UV reflectometer positions, and then to compare the reflectance data against reflectance data taken from a collection of control samples having known surface characteristics at the same plurality of UV reflectometer positions. The reflectances of the control samples are collected in a calibration matrix, which may be a graphical plot or may be part of a computer software program, in the form of a look-up table. The reflectances of the test sample are compared to the reflectances of the control samples across the spectrum. By the comparison, the desired surface characteristics are thereby predicted by finding the closest fit among the reflectance sets of the control samples in the calibration matrix, and by calibrating the corresponding known surface characteristics of the control sample with the closest fit to the test sample.

Thus, a first step in the method of the first embodiment of the present invention is to provide a calibration matrix of reflectance data of control samples of known surface conditions at a plurality of UV reflectometer positions. The control samples are preferably categorized together by material type, such that a material such as polysilicon would be categorized together, and other materials such as aluminum would be categorized separately. In creating a calibration matrix, the surface characteristics of the control samples are first independently evaluated using an independent method such as SEM, TEM, or AFM.

The reflectances of each control sample are taken across the spectrum of ultraviolet light wavelengths at a plurality of angles of reflection and are included in a calibration matrix for each specific material. Each set of reflectances of each control sample can be included as a separate file, or the set of reflectances of any one control sample may be further refined to a single data point or several data points representative of each control sample by an algorithm which gleans information from the broad spectrum and refines it down to the one or several data points. These data points are correlated with the respective surface characteristics such as surface area or grain size and incorporated into the calibration matrix.

A further step is to measure the reflectances of the test sample across the same spectrum of ultraviolet wavelengths and at the same plurality of angles of reflection, preferably one measurement for each integer wavelength in the range of between about 220 and about 450 nanometers. In so doing, the light is reflected from the angle of incidence from the test sample and collected again in a sensor. The intensity of the light returning to the sensor is then quantified as the reflectance at each angle of reflection that the UV reflectometer is positioned at. The lower wavelength range limit of around 220 nanometers is typically a limitation of the reflectometer, and the upper wavelength range limit of about 450 nanometers is typically taken at or about the boundary where the material being measured becomes translucent to the light.

The next step is to compare the reflectances of the test sample to those of the control samples collected in the calibration matrix. In so doing, a suitable mathematical algorithm may be used. One such algorithm is the partial least squares method. The partial least squares method compares the set of reflectances of the test sample with the set of reflectances of each of the control samples in the calibration matrix and determines the closest fit. The surface conditions to be determined, such as surface area, surface roughness, grain size, and grain boundary size, which are known for the closest fitting control sample in the calibration matrix, are assigned as the calibrated result. Any algorithm by which one series of data may be found to correspond to another series of data with a desirable level of accuracy in a calibration or look-up method may be used for the comparison.

Another possible algorithm, given by way of example, compares the maximum reflectance in a given range of wavelengths with the minimum reflectance in a second given range of wavelengths, subtracts the minimum reflectances from the maximum reflectance and stores the difference as a delta value for each of a plurality angles of reflection. The delta value is then plotted on one axis of a chart against the maximum reflectance on a second axis. Thus, the spectra of wavelengths is reduced to a single point for each angle of reflection. This point may then be easily compared to other such points which are plotted or stored in the calibration matrix. The calibration matrix can be stored in a computer data base or charted in a graphical plot. This embodiment is particularly useful for ex situ product development.

A second embodiment is better suited for in-process product monitoring and comprises selecting a wavelength or group of wavelengths within the ultraviolet spectrum wherein the sensitivity to the surface characteristics being monitored is greatest. The reflectance measurement is conducted at a single ultraviolet wavelength or across a spectrum of multiple ultraviolet wavelengths, depending on how much information is needed and how consistent the information must be. The reflectances are preferably measured during or directly after the formation of the film to be monitored. Preferably, the measurement is conducted during a cooling stage in the film manufacturing process. In the monitoring of HSG polysilicon, for example, reflectance measurement can be conducted directly on an HSG polysilicon forming machine.

The measured reflectances, which are preferable made for a plurality of angles of reflection, can be used to provide quantitative data regarding the surface characteristics of the film, or can be compared to a range of acceptable reflectances which has been predetermined by measuring the reflectances of a set of control samples with known surface characteristics.

The method of the present invention in the described embodiments can be used for evaluating the surface characteristics of a variety of materials, and is especially beneficial for use in determining the surface area of polysilicon during the production of capacitor plates in integrated circuits. The method can be conducted in-process, is nondestructive, and requires a minimum of technician training. Furthermore, it is minimally sensitive to atmospheric conditions and vibrations. Also, it works effectively for materials of low surface roughness as well as for materials with high surface roughness. Furthermore, the method is capable of accurately providing a quantitative evaluation of a desired surface characteristic.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention will be illustrated, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
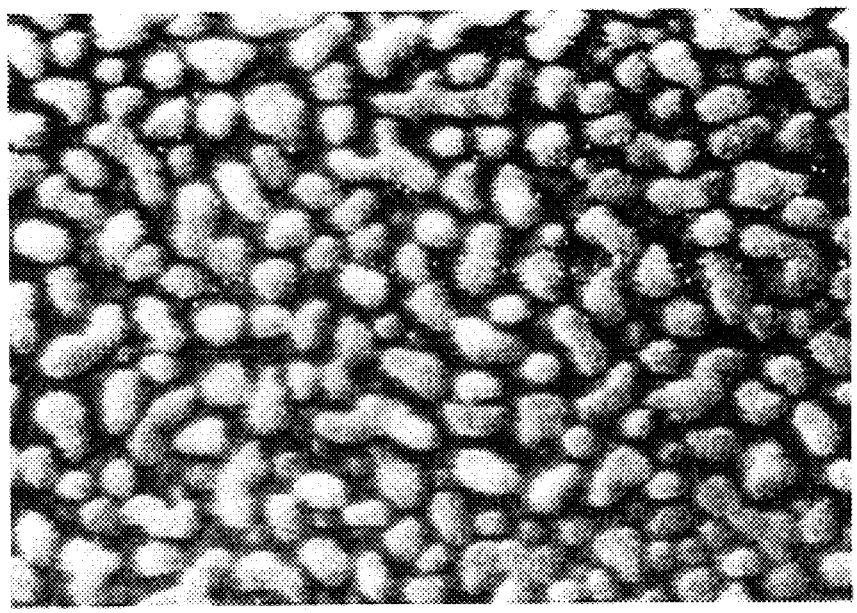
FIG. 1 is a graphical representation of an HSG polysilicon film sample with moderately sized gins of relatively uniform shape.
Figure 2:
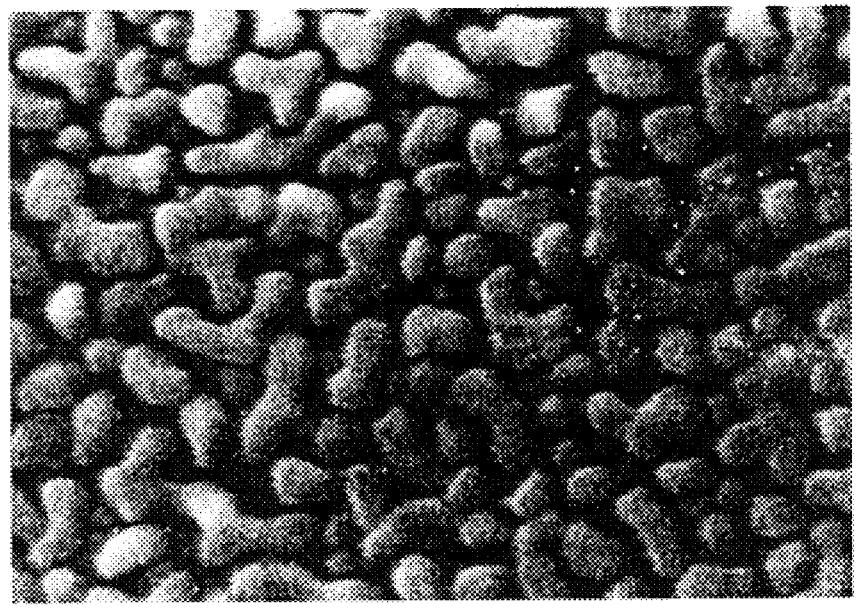
FIG. 2 is a graphical representation of an HSG polysilicon film sample with larger and more irregularly shaped grains than those of FIG. 1.
Figure 3:
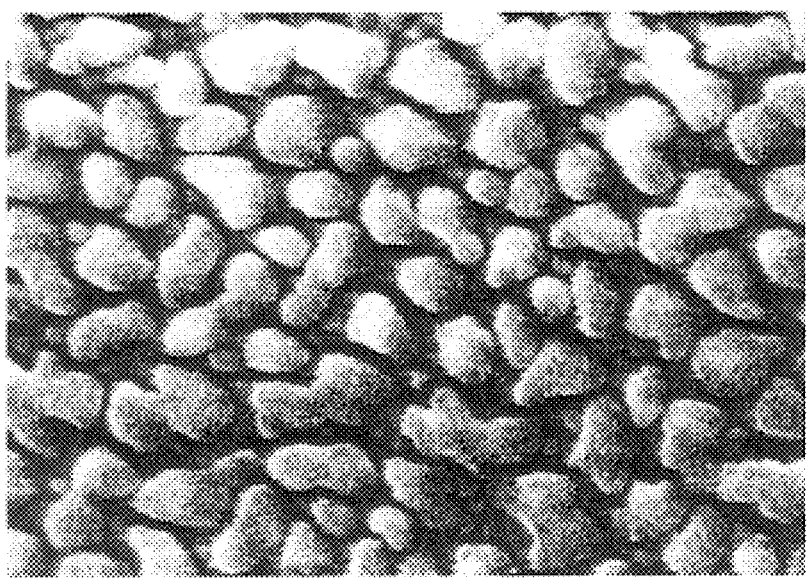
FIG. 3 is a graphical representation of an HSG polysilicon film sample with grains of even larger size than those of FIG. 2, but having a somewhat more regular shape.
Figure 4:
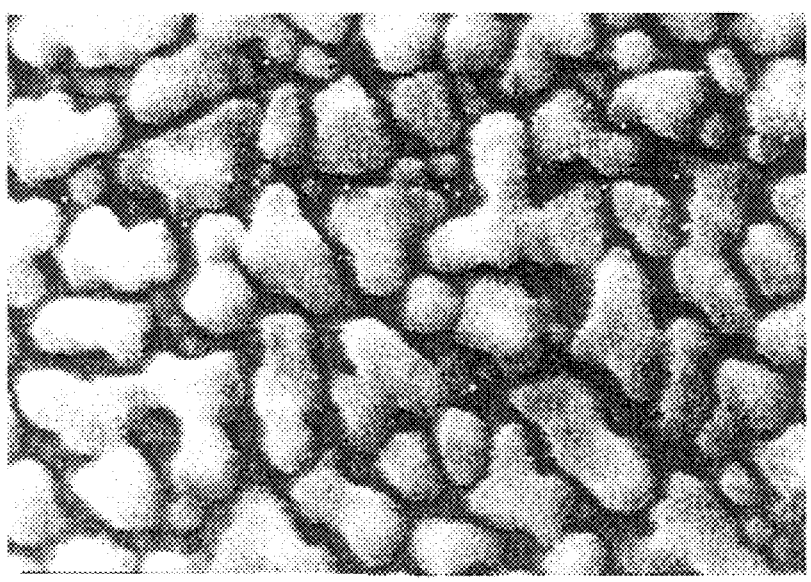
FIG. 4 is a graphical representation of an HSG polysilicon film sample having grains of a larger size than those of the sample of FIG. 3 and also more irregular shaped.

The present invention involves the discovery that with the use of a broad spectrum of wavelengths of ultraviolet light between about 220 and about 450 nanometers, a sufficient amount of information can be gleaned about the surface characteristics of a sample of opaque material, such as polysilicon, to effectively evaluate the surface characteristics of the sample for process development purposes. It has also been discovered that measurement of the reflectances of a sample at one or more wavelengths from a reflectometer installed on a production process line can give sufficient information about a specific surface characteristic of the sample for which the wavelengths have been chosen for high selectivity to accurately predict whether the test sample will meet certain operation requirements. It is preferable that the measurement of the reflectances be taken at a plurality of reflection angles so as to obtain more data.

It has been further discovered that such raw data used either in-process or in the product development stage can be transformed through the use of a mathematical algorithm into an accurate quantitative prediction of surface characteristics. The surface characteristics that can be predicted using the method of the present invention include general roughness, grain size, grain shape, grain boundary size, regularity of grain shape, and ultimately, the surface area of the sample.

In accordance with the above discovery, the present invention comprises a method for analyzing a sample of unknown surface characteristics, which is made of an opaque material and which will be hereinafter referred to as "the test sample." The analysis is conducted using a UV reflectometer to measure the reflected intensities of the test sample at one or a number of different wavelengths across the ultraviolet spectrum. It is preferable to measure the reflected intensities at a plurality of angles of reflection to obtain more data. When doing so, it has been found that smooth, shiny surfaces reflect greater amounts of light, while rough surfaces scatter light to a greater degree, with the degree of scattering differing at each wavelength.

At a 90° angle, reflected light will generally have a lower intensity for a rougher film and a higher intensity for a smoother film, though intensity will again vary at different wavelengths. Furthermore, different surface characteristics such as grain size, grain shape, and grain boundary size, which together affect the total surface area, each scatter light differently, and at different amounts for each wavelength. These effects of different scattering of light for different surface characteristics and at the various wavelengths are synthesized in one embodiment of the present invention to create a "fingerprint" of each test sample. Measurements of intensity of reflected light taken at a plurality of angles of reflection increase the data that can be used to discern surface characteristics.

The present invention comprises several general embodiments, the first of which utilizes at least a substantial portion of the ultraviolet spectrum to provide detailed information suitable for process development and determination of process parameters, and a second embodiment providing a quick determination of variations in surface characteristics beyond an acceptable range for use for in-process quality control monitoring. The first embodiment to be described is the broad spectrum process development analysis.

A preliminary step in the method of the first embodiment of the present invention is the compilation of a calibration matrix of reflectance data correlated with surface characteristics of a group of control samples which are made of the opaque material being examined. The control samples preferably range over a variety of known surface characteristics such as roughnesses, grain sizes, grain shapes, grain boundary sizes, and surface areas. The reflectance data will preferably be accumulated for a plurality of angle of reflection. Generally, the larger and more comprehensive the calibration matrix is, the more accurate will be the assessment of the test sample to be characterized from the reflectometer measurements.

The reflectances are measured under the present invention with a UV reflectometer such as a Promatrix UV 1050™ manufactured by Tencor Corporation of Santa Clara, Calif. The UV reflectometer is moveable over the surface from which reflectance intensity measurements are taken so that the angle of reflection can be varied. The known surface characteristics are typically determined with the use of one of the SEM, TEM, or AFM methods discussed in the background section above, or with the use of other independent methods. The compiled reflectances are preferably taken over a broad range of the ultraviolet spectrum, typically over the range of about 220 to about 450 nanometers, and at a plurality of angles of reflection. The measured reflectances are compiled in a calibration matrix, which will typically comprise plotting the reflectance values in a graphical plot, or storing the reflectance values in a look-up table of a computer software program.

Thus, a separate file is created for each control sample, including each of the reflectance values, and is identified with the particular surface characteristics of the control sample. The files are then incorporated into the calibration matrix.

A further step of the method of the first embodiment of the present invention is to then measure the reflectance of the test sample using the UV reflectometer at the same plurality of angles of reflection. The data is preferably measured over the same spectrum of the UV wavelengths for which the control sample data was measured. Again, this spectrum preferably includes the same increments between about 220 nanometers and about 450 nanometers. The use of the broad spectrum of UV wavelengths allows for the collection of a greater amount of information about the surface conditions of the test sample, and helps to create a more accurate "fingerprint" for comparison to control samples.

The selected spectrum of between about 220 and about 450 nanometers is not a fixed range, and in the present embodiment, the lower range limit of 220 nanometers is selected because 220 nanometers corresponds to the shortest wavelength emitted by and detected by current UV reflectometers. Of course, even shorter wavelengths could also be used as reflectometers with greater capabilities are developed. The upper limit of around 450 nanometers is selected as the approximate wavelength where the ultraviolet light spectrum ends and the visible light spectrum begins. Visible light penetrates more deeply into the silicon than UV light, tending to be affected more by bulk material property information, and may add little information about surface characteristics. Thus, the upper range limit will vary with each particular material. For instance, polysilicon has a lower density than aluminum and a higher upper range limit could conceivably be used.

In measuring the reflectances, the light emitted by the UN. reflectometer is reflected at an angle of incidence normal to the test sample, and the reflected light from the wavelengths between about 220 and about 450 nanometers are collected and stored in a plot of reflectance versus wavelength, or in computer memory with the reflectances forming the fingerprint of the surface conditions of the test sample. It is preferred to vary both the angle of incidence to the test sample and the angle of reflectance at which the reflectance intensity is measured. This additional data provides more information that can be used to discern surface characteristics.

The final step in the method of the first embodiment of the present invention is to compare the reflectance data against the calibration matrix data. In one embodiment, the comparison is conducted using a mathematical calibration algorithm. The mathematical calibration algorithm is a numerical method for quantifying properties such as the surface roughness of the test sample with spectral information. The calibration algorithm compares the reflectance data collected from the test sample against that of the group of control samples collected into the calibration matrix, and calibrates the surface characteristics of the test sample from the spectrum which has been measured. This method is of a highly quantitative nature, due to the amount of data collected, and due to the manipulation of that data by the mathematical calibration algorithm, and thus will produce data which is more precise and predictable than that produced by the single wavelength method.

One mathematical calibration algorithm that has been used successfully is the partial least squares algorithm, which is a mathematical computation typically performed by a computer, and which correlates one set of test data to many sets of control data in order to find the closest fit of the set of test data to a set of control data. Partial least squares is a method known in the art and is given merely as one example of the many possible algorithms that could be used.

A further example of a possible mathematical calibration algorithm that could be used for the comparison step is the "delta correlation algorithm." Under the delta correlation algorithm, a maximum reflectance is first determined and is selected from the reflectances of the test sample over the wavelengths in the range of preferably between about 350 to 390 nanometers. Next, a minimum reflectance is determined using the reflectances of the test sample over the range of wavelengths of preferably about 290 to 325 nanometers. A delta correlation value is then calculated by subtracting the minimum reflectances from the maximum reflectances. Then, the delta correlation value is plotted on one axis against the maximum reflectance on the other axis. This same algorithm is used to construct the calibration matrix using a plurality of control samples, each control sample having at least one known surface characteristic. Thus, it is a simple matter to compare the plotted point of the test sample against the plotted points of the control samples of the calibration matrix and find the closest fit to a particular control sample. The closest fit to a particular control sample indicates a corresponding surface characteristic of the test sample.

Figure 5:
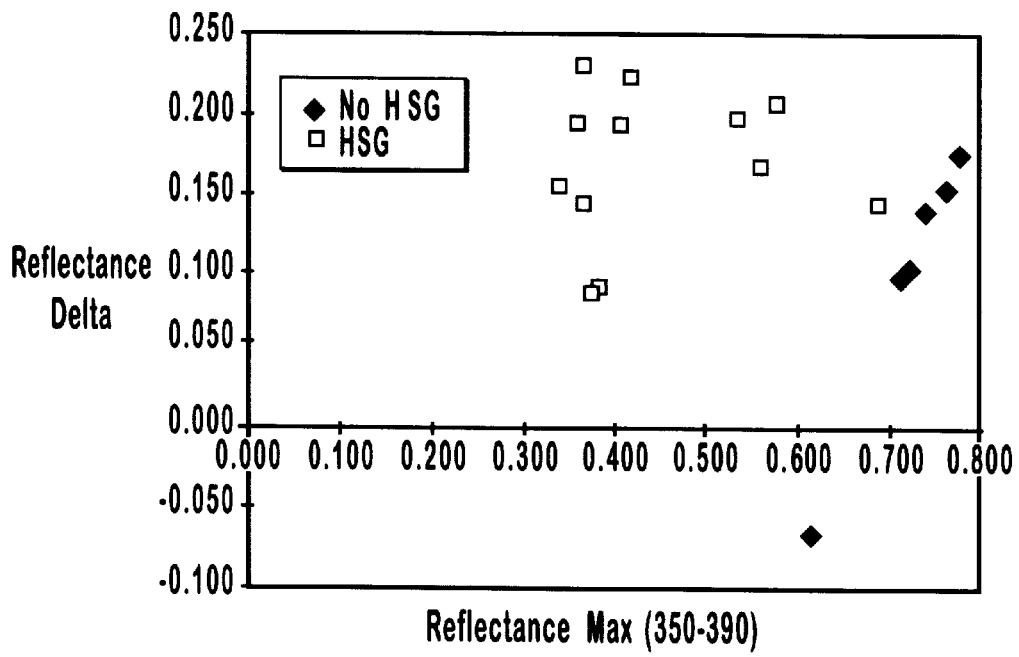
FIG. 5 is a graphical plot constricted with the method of the present invention showing the delta correlation values of a set of test samples of unknown surface characteristics with maximum reflectances of the test samples plotted on the horizontal axis and corresponding delta correlation values plotted on the vertical axis.

FIG. 5 is a graphical plot of the delta correlation values of a set of 18 test samples of unknown surface characteristics. Therein it can be seen that the maximum reflectance of each test sample taken in the range of 350 to 390 nanometers is plotted against the delta correlation value. Spacing is seen in FIG. 5, both laterally and vertically, of the graphically illustrated data of the samples. The spacing is due to not only differences in roughness, but also to differences in grain size, grain shape, grain boundary width, etc. Thus, a change in any of these variables would result in a change in the location of the plotted points. These plotted points can then be compared to the calibration matrix, which could be a similar plotted graph, having plotted points such as those of FIG. 5, but correlating the known surface conditions for the control samples at each plotted point. Then, by comparing the delta correlation value and maximum reflectance of the test sample to the closest plotted point, and noting the known surface characteristics of the control sample at that point, the desired surface characteristics of the test sample can be determined.

Figure 6:
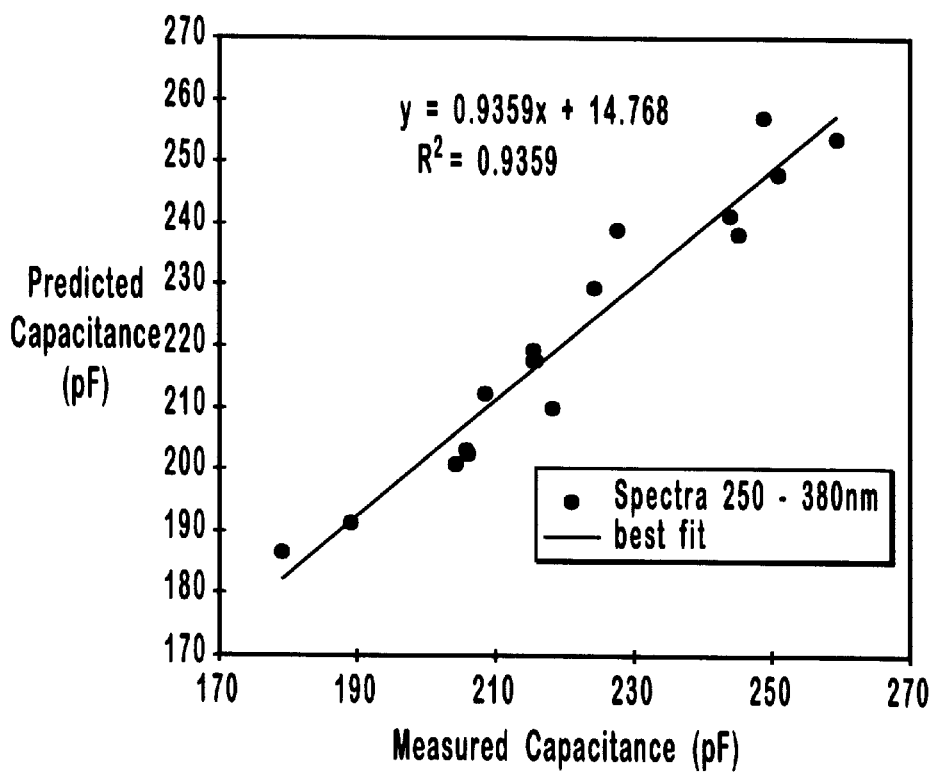
FIG. 6 is a graphical plot of the capacitance predicted using the method of the present invention the vertical axis plotted against the actual measured capacitance determined with an independent method on the horizontal axis.

FIG. 6 is a graphical plot of a set of 16 test samples of a material with unknown surface characteristics which have been subjected to the ultraviolet light reflectance method of the present invention. The surface areas of the 16 test samples have been calculated using a calibration matrix and a partial least squares algorithm in a computer software program in the manner discussed above. As capacitance is directly proportional to surface area, the predicted capacitance is directly determined therefrom.

The graphical plot of FIG. 6 charts the predicted capacitance on the vertical axis against the actual measured capacitance determined with an independent method on the horizontal axis. The plot illustrates the close correlation of the predicted capacitance to the actual determined capacitance. The current plot has a correlation between predicted and actual capacitance of approximately 94%. This has been achieved using a general algorithm, such as a partial least squares, with a minimally sized calibration matrix. Thus, the accuracy could be even better with the use of a larger calibration matrix and a more sophisticated and well-tailored mathematical calibration algorithm.

The method of the first embodiment of the present invention works well for opaque surfaces, and has been found to work particularly well with rough surfaces and especially with HSG polysilicon. A further example of a material for which the present invention could be used to determine the surface characteristics of is aluminum. Aluminum, in contrast to HSG polysilicon, is desired to have a smooth surface, but often results in a rough surface when process parameters are not ideal. The method of the present invention could also be used to verify the proper operation of aluminum deposition equipment, and to adjust the parameters used to deposit the aluminum. It will be obvious to one skilled in the art that the present invention will be beneficial for use with any opaque material for which the surface characteristics must be monitored.

A further feature that can be incorporated into the method of the first embodiment of the present invention is spectroscopic elipsometry. With the use of a spectroscopic elipsometer, information about the polarity of the light reflected from the sample can be measured in addition to measuring the reflectance. It is preferable that reflectance is measures at a plurality of angles. This will provides an added dimension of information to the characterization method.

The first embodiment of the present invention is preferred for use in product development, for assistance in setting the parameters used in developing various films having specific surface characteristics, such as HSG polysilicon, for instance, which is desired to have a high degree of surface roughness. Correspondingly, the second embodiment of the present invention is preferred for in-process monitoring of opaque materials of high surface roughness for quality control purposes.

Figure 7:
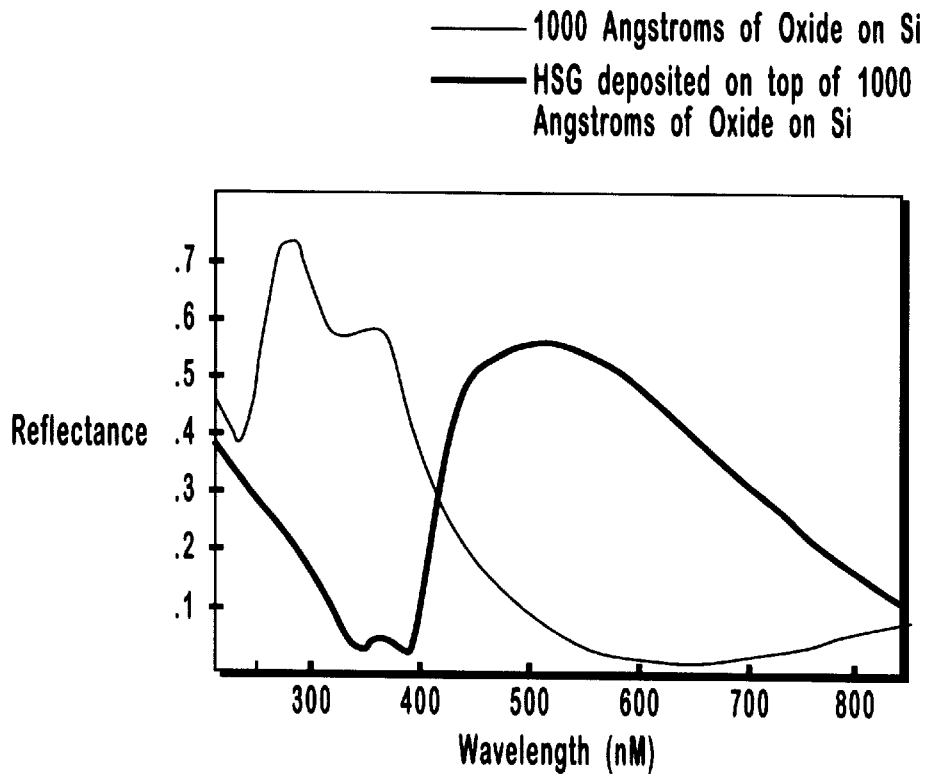
FIG. 7 is graphical depiction of the reflectances over a range of wavelengths of a film of silicon dioxide before and after a layer of HSG polysilicon has been formed over it.

The second embodiment of the present invention relies upon the theory that the reflectometer data response varies continuously across the UV wavelength spectrum and with material type and roughness and with the angles of reflection at which reflectance intensities are measured. Also, certain surface characteristics, particularly those of opaque materials of high surface roughness, can be determined by utilizing a set of one or more wavelengths for which a sensitivity to the surface characteristic being determined has been maximized. For instance, FIG. 7 is a graphical representation of the reflectances caused by the deposition of a film of HSG polysilicon over a silicon dioxide surface. The thin line shows the reflectances of the bare silicon dioxide surface, and the heavy line shows the reflectances of the surface after the deposition of a HSG polysilicon. Note that at the range of wavelengths of between about 300 and 400 nanometers, the greatest difference between the reflectances of the bare silicon dioxide and the HSG polysilicon occurs. It has been determined that within this range of wavelengths, reflectance changes will have the greatest sensitivity to the surface characteristic of surface roughness.

Figure 8:
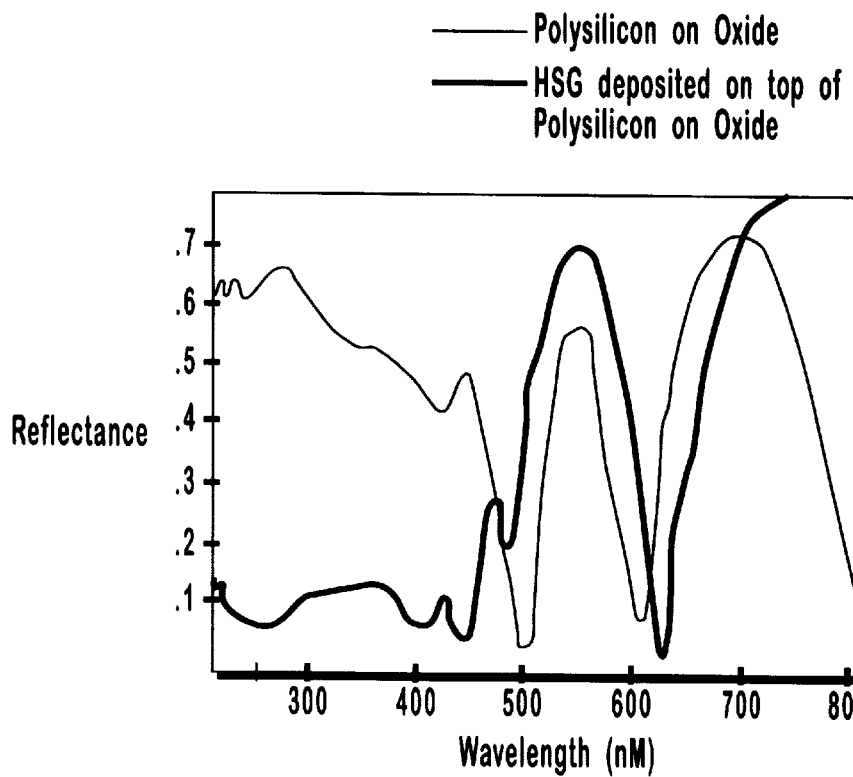
FIG. 8 is a graphical depiction of the reflectances over a range of wavelengths of a film of polysilicon on silicon dioxide before and after a layer of HSG polysilicon has been formed over it.

FIG. 8 graphically depicts the reflectance change resulting from the deposition of HSG polysilicon on top of a polysilicon layer. Therein, it can be seen that the difference in the reflectances of the polysilicon film and the HSG polysilicon layer is greatest in the range of between about 300 and 400 nanometers. It has been concluded that this range of wavelengths of high sensitivity can be used to produce accurate surface roughness data for a wide variety of surface types, including silicon dioxide and polysilicon. It has also been determined that this sensitivity holds true for both blanket layers as well as patterned layers. This range of high sensitivity is very useful for materials of high surface roughness, which are hereby defined as materials having an average surface roughness of about 30 nanometers or greater, and will be even more useful for materials such as HSG polysilicon having an average grain size of about 60 nanometers or more. Using this manner of locating the range of sensitivity to given surface characteristics, ranges of high sensitivity can be determined for other surface characteristics as well.

The method of the second embodiment will now be described in a specific application in which HSG polysilicon is evaluated for surface roughness. The method of the second embodiment comprises in a first step, collecting a set of control samples of the opaque material being monitored which have a desired level of the surface characteristic being evaluated. The set of control samples are selected to have varying levels of surface roughness.

In a further step, the reflectances of the control samples are measured at a plurality of angles of reflection. A calibration measurement can be constructed with the measurements as in the first embodiment. Preferably, however, the measured reflectance data is used to determine a certain acceptable range of the surface characteristic being evaluated due to variations in operating parameters. Other surface characteristics can also be varied within typical operating ranges of the operating parameters. Their effects on the acceptable range are then calculated and taken into account when determining whether the surface characteristic being monitored is outside the acceptable range.

The next step is the production of the film. In the case of HSG polysilicon, this will typically be conducted using known methods. During the film production process, a reflectometer is used at a stage of the process where throughput will not be reduced, such as at a cooling stage, to measure the reflectance of the test sample of the material at one or more wavelengths and at the same plurality of angles of reflection. The reflectometer can be mounted directly on the processing machine to facilitate in situ measurements. In the case of HSG polysilicon, for instance, the reflectometer can be mounted within either a single wafer processing machine such as an RTP machine, or within a multiple wafer processing machine such as a tube furnace.

The reflectance measurement is conducted with the plurality of angles of reflection and with the set of one or more wavelengths within the range which has been chosen for maximized sensitivity. For instance, in the case where surface roughness of HSG polysilicon is being monitored, the range of between about 300 to 400 nanometers is preferred. Using a broader range of wavelengths will be more accurate than using a single wavelength or relatively few wavelengths, and a more accurate "fingerprint" can be created thereby, as discussed for the first embodiment. Using a greater amount of wavelengths and angles of reflection will produce more information and be more consistent, but using a single wavelength or relatively few wavelengths is quicker and has been found to provide sufficient information to determine if the surface characteristic being monitored is within a predetermined, acceptable range. Thus, the number of wavelengths at which the reflectance is taken can be selected according to the needs of the process.

Once measured, the set of one or more measured reflectances of the test sample is compared to the set of reflectances of the control samples. This can be done with the use of a calibration matrix as described above, or can comprise a determination of whether the set of one or more wavelengths falls within the acceptable range that has been previously determined. When the one or more reflectances fall within the predetermined acceptable range, as determined from the control samples, the test sample will pass the quality control test. If the one or more measured reflectances fall outside the range of acceptable levels for the particular surface characteristic being evaluated, the test sample will be rejected, the process will be stopped, and the parameters readjusted. This eliminates the cost of producing multiple batches of wafers with failure conditions. The method of the first embodiment can be used in conjunction with this method in order to determine how the surface characteristics have diverged for a failed test sample, and what must be done in order to properly reset the parameters.

The reflectance measurement can be conducted before or after doping of the polysilicon or underlying layers. If conducted after doping, a set-off for the variation in reflectance caused by the doping level should be incorporated into the acceptable range. An added advantage to conducting the reflectance measurement after doping is that not only will it determine if surface roughness is within the acceptable range, but it can also be used to determine if the doping concentrations of the surface of the test sample are correct. Any deviation beyond acceptable ranges will notify the operator that one of either the surface area or proper doping levels has changed. The dopants used with materials such as HSG polysilicon typically comprise one or more elements from within groups III and V of the periodic table.

A further stage of the development process wherein the reflectance or reflectances can be monitored is after a second layer has been deposited above the opaque material which is being monitored. For instance, in the manufacturing of capacitors with HSG polysilicon capacitor plates, it may be more convenient and more consistent data may be obtained by measuring the set of reflectances of the test sample after an intermetal dielectric layer has been deposited over the HSG polysilicon film. It may also be more convenient to take the measurement after an overlying refractory metal has been placed over the HSG polysilicon film, or over both the HSG polysilicon film and the intermetal dielectric layer. By again collecting a group of control samples, as described above, and thereby determining a proper range within which the reflectance or reflectances should fall, the quality control process can be conducted. One advantage to measuring the reflectances after the dielectric layer has been deposited is that the measurement may be less sensitive to other surface characteristics which are not being monitored, thus creating greater accuracy for the particular surface characteristic, such as roughness or surface area, which is being detected.

The method of the second embodiment works equally as well with blanket layers or patterned layers, whether there are multiple layers formed on a silicon substrate, or whether only a single layer is located on the silicon substrate.

The method of the second embodiment can be used at any stage in the manufacturing process, and can be used for any opaque material, but is preferably used for materials having a high degree of surface roughness, such as HSG polysilicon. The method can be used on films formed in situ or deposited, annealed or unannealed, doped or undoped, selective or unselective. The method of the second embodiment is preferred to be conducted in the manufacturing process at a cooling stage so that high throughput is maintained.

From the foregoing discussion, it can be seen that a method has been provided for the evaluation of surface characteristics of opaque materials, and particularly for opaque materials of high surface roughness. The present invention provides a method of surface characterization that it is nondestructive to the test sample and therefore applicable to in-process product evaluation, such as during the fabrication of capacitor plates of an integrated circuit structure. It is rapid, economical, and provides an accurate quantitative determination. The method can be conducted without the need for operators having a high degree of skill and training, and is not highly sensitive to varying surface and atmospheric conditions. Furthermore, in-process surface characteristics monitoring can be conducted with the present invention without substantially lowering throughput of the manufacturing process.

The present invention also includes third, fourth and fifth embodiments that all involve measuring the intensity of the reflected electromagnetic radiation (EMR), such as light, from a surface of an opaque material using an intensity measuring device, such as a UV reflectometer, that is positioned at a plurality of angles of reflection for a given angle of incident EMR. In each of the third, fourth and fifth embodiments, surface characteristics of the opaque material can be derived. The third embodiment determines if the surface of the opaque material is smooth, the fourth embodiment determines if the surface of the opaque material has prismatic irregularities, and the fifth embodiment determines if the surface of the opaque material has hemispherical irregularities. Further variations of the inventive method include various combinations of the embodiments.

A discussion of the third, fourth and fifth embodiments will now be had in which FIGS. 9–17 and Equations 1–4, below, will be referred to. These figures and equations will serve to demonstrate that by measuring the intensity of the reflected EMR from a surface of an opaque material which an intensity detector positioned at different angles of reflection for a given angle of incident EMR, surface characteristics thereof can be derived, such as whether the surface is smooth, if it has prismatic irregularities, or if it has hemispherical irregularities. For the purpose of clarity, FIGS. 9, 14, and 16 and Equations 1–4 are set forth as two dimensional representations. Those of skill in the art will understand the related derivations of both three dimensional figures and equations, as the principles are the same for both two and three dimensional representations.

Figure 9:
FIG. 9 is a two dimensional representation of prismatic and hemispherical irregularities on a smooth opaque surface.

The inventive method of the present invention provides that by changing the angle incidence and the angle of reflection at which the intensity detector detects the intensity of reflected EMR, various surface characteristics of an opaque film can be learned. A two dimensional representation of a smooth surface having thereon both prismatic and hemispherical irregularities is shown in FIG. 9. A surface having thereon HSG polysilicon would be represented by hemispherical irregularities, while other surfaces could be represented by prismatic irregularities. A prismatic irregularity is defined herein as an irregularity that has flat surfaces, which are typical of crystalline surfaces.

On an opaque surface, all the incident EMR is either absorbed or reflected. None of the EMR is transmitted or reflected off lower layers. On a perfectly smooth surface the EMR will be reflected specularly, so that the angle of incidence will equal the angle of reflection.

I. Flat Smooth Surface

Figure 10:
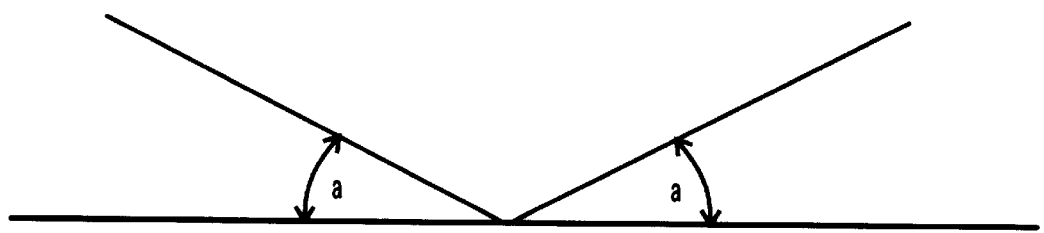
FIG. 10 represents a specular reflection off of a smooth opaque surface.
Figure 11:
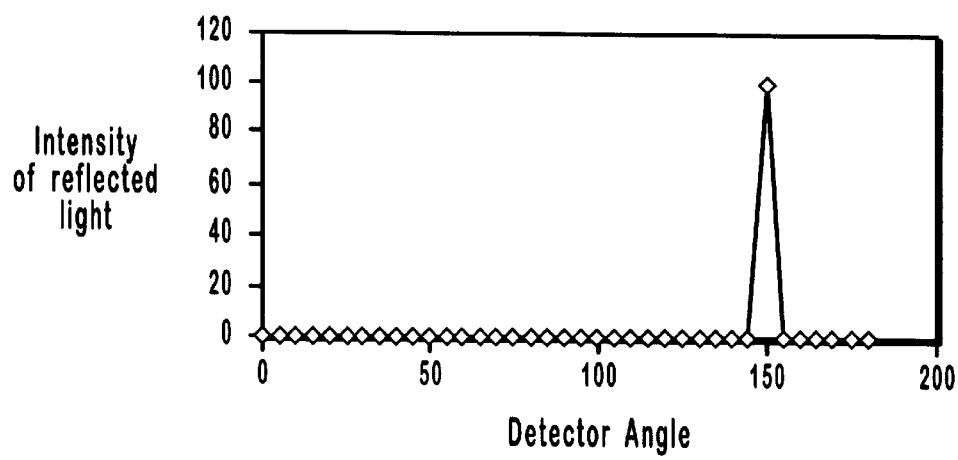
FIG. 11 is a graphical representation of a hypothetical reflectance for a smooth surface.

In the third embodiment, the inventive method determines whether a flat surface of an opaque material is smooth. If the flat surface is smooth, all the reflected light will be detected at an angle of 180 degrees—a, where a is the angle of incidence. FIG. 10 shows specular reflection off a smooth surface. If the surface is not smooth, the light will be scattered at different angles depending upon the structure of the surface irregularities. FIG. 11 shows a hypothetical graphical plot of the intensity of the reflected light vs. the angle of the UV reflectometer at which reflected light intensity is detected for a smooth surface where the incident angle was assumed to be 30°.

II. Flat Smooth Surface With Prismatic Irregularity

Figure 12:
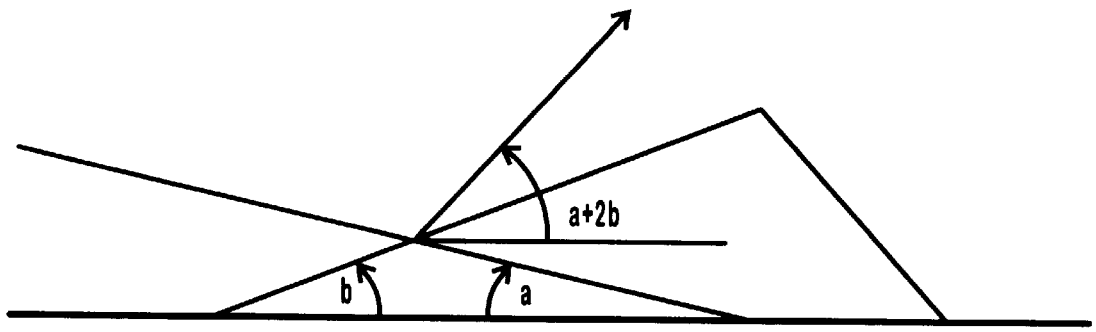
FIG. 12 represents a reflection that is caused by a prismatic surface irregularity.

In the fourth embodiment, the inventive method determines whether a flat smooth surface of an opaque material has a prismatic irregularity thereon. If the flat smooth surface has a prismatic irregularity thereon, such as a polycrystalline surface, the scattered light will be reflected at well defined angles. As shown in FIG. 12, if the prismatic irregularity forms an angle b with the surface and the incident light comes in at an angle a, the light will be reflected at an angle r as express in Equation 1:

$$r=180-a-2b \qquad \text{Equation 1}$$

Figure 13:
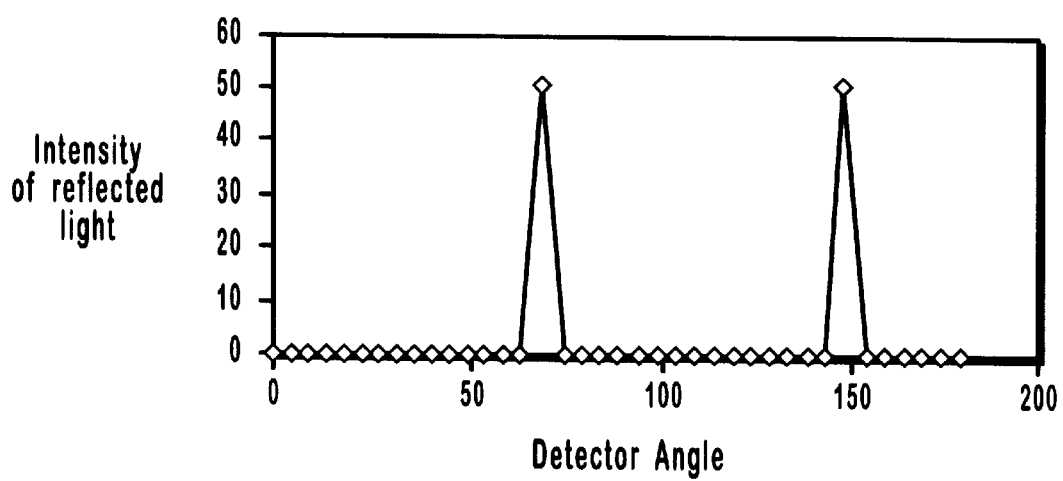
FIG. 13 is a graphical representation of a hypothetical reflectance from a prismatic surface irregularity.

If there is one prismatic irregularity on an otherwise smooth surface, the graphical plot of the intensity of the reflected light vs. the angle of the UV reflectometer will have two peaks, as seen in FIG. 13. One of the peaks represents the smooth surface and the other peak represents the prismatic irregularity. The relative intensity of the two peaks will depend on the size of the incident light beam and the size of the prismatic irregularity. FIG. 12 shows a hypothetical graphical plot where the incident beam angle, a, is at 30°. Using Equation 1, r=180°−a−2b, the angle of the prismatic irregularity, b, is calculated to be 40 degrees, where the light reflected at an angle, r, is equal to 70°, and the incident beam angle, a, is equal to 30°. Thus, r=180°−a−2b=180°−30°−2(40°)=70°. The area of the reflecting face can also be calculated from the angles, intensities and the size of the incident light beam.

The sizes of prismatic irregularities can be estimated using Equation 2:

$$\text{Average Size}=(A/n)*(I_i/I_T) \qquad \text{Equation 2}$$

For the size of prismatic irregularities that are estimated using Equation 2, A is the area illuminated by the incident light, n is the number of non-specular peaks, $I_i$ is the integrated intensity of all the non-specular peaks, and $I_T$ is the integrated intensity of all reflected light. The area A can be calculated using Equation 3:

$$A=W_B/\cos(a) \qquad \text{Equation 3}$$

In Equation 3, A is the area illuminated by the incident light, $W_B$ is the width of the incident beam, and a is the angle of incidence. In the application of Equation 2 for the size of prismatic irregularities, is it preferable that $I_i$ and $I_T$ are measured with the incident angle, a, close to 90 degrees to get a good estimate of the ratio of the smooth area and the area of the irregularities. It is also preferable that area, A, and the number of non-specular peaks, n, are measured and calculated using a smaller incident angle, a, than 90 degrees so as to minimize multiple reflections.

III. Flat Smooth Surface With Hemispherical Irregularity

Figure 14:
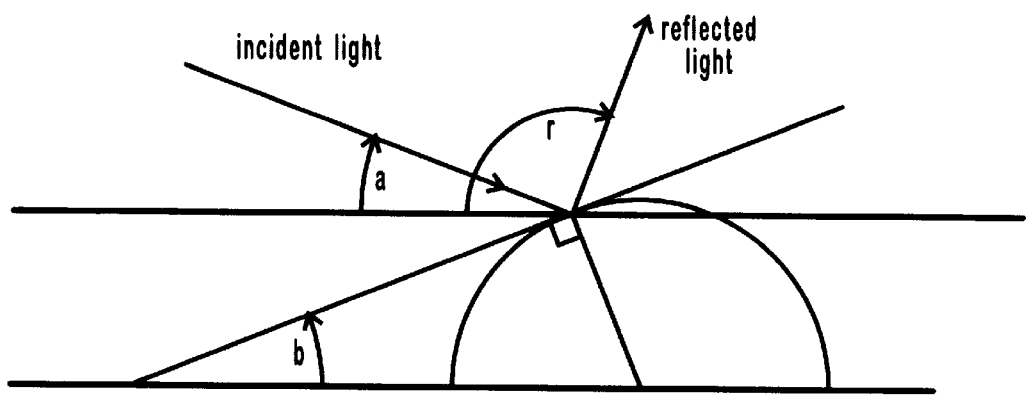
FIG. 14 represents a reflection that is caused by a hemispherical surface irregularity.

In the fifth embodiment, the inventive method determines whether a flat smooth surface of an opaque material has a hemispherical irregularity thereon. If the flat smooth surface has a hemispherical irregularities thereon, as seen in FIG. 14, the light will be reflected at all angles.

The intensity of the light reflected at an angle of r can be expressed as:

$$I_r=I_0 \cos(r/2-a/2) \qquad \text{Equation 4}$$

In Equation 4, $I_r$ is the intensity of the light reflected at an angle r, $I_0$ is the intensity of the light reflected directly back at the light source, and a is the angle of the incident light. If the angle r of the light reflected is equal to the angle a of the incident light, then the intensity $I_0$ of the light reflected directly back at the light source is equal to the intensity Ir of the light reflected at an angle r. Stated otherwise, if r=a, then $I_r=I_0$.

Figure 15:
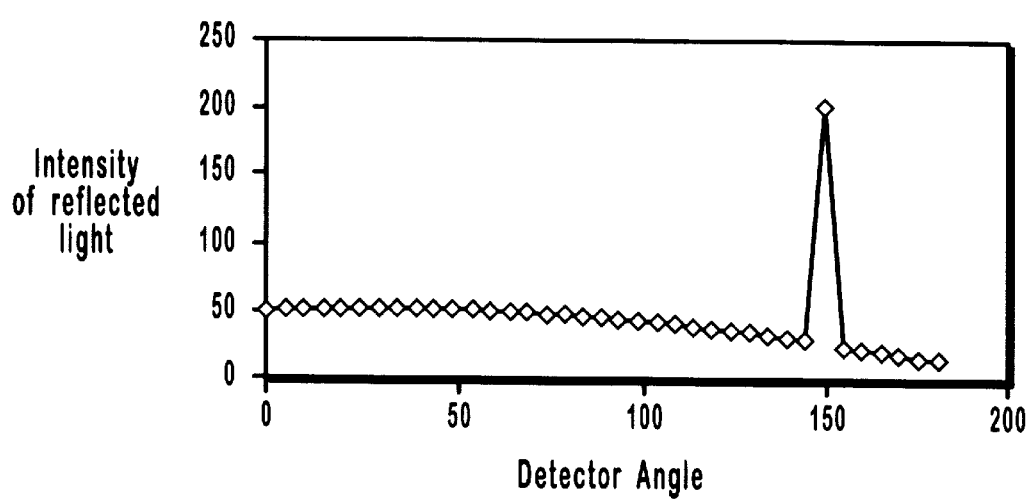
FIG. 15 is a graphical representation of a hypothetical reflectance from a hemispherical surface irregularity.
Figure 16:
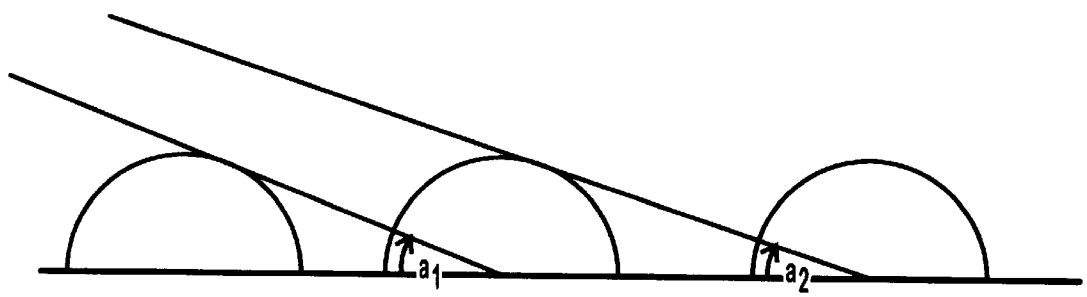
FIG. 16 is a two dimensional representation of reflection from a surface having hemispherical surface irregularities thereon.

If the surface were smooth with one hemispherical irregularity the graphical plot would be similar to that seen in FIG. 15, where the incident angle, a, was assumed to be 30°. There would be a sharp peak in the intensity of reflected light from the specular reflection of the smooth surface and there would be a broad peak having a maximum of the intensity of reflected light occurring at the angle of incidence, a, from the hemispherical irregularity. Equation 4 mathematically expresses the broad peak of a hemispherical irregularity surface characteristic.

Figure 17:
FIG. 17 is a graphical representation of the increase in reflectance as an angle of reflection increases for a surface having hemispherical surface irregularities thereon.

In a variation of the fifth embodiment, the inventive method also includes a technique by which the sizes of hemispherical surface irregularities can be estimated using Equation 2. A difference in the application of Equation 2 for estimating the sizes of hemispherical surface irregularities is in calculating the number of peaks, n. It is preferable that the number of peaks, n, not be calculated by counting the number of peaks. Rather, one way of estimating n is to vary the incident angle, a, and measure the intensity of the reflected light at the incident angle, a. At small incident angles, a, no light will be reflected because the other irregularities will block the light, as is demonstrated in FIG. 16. There will not be any reflection at incident angle, a, until angle a exceeds $a_2$. If the incident angle continues to increase, the intensity of the light reflected at incident angle, a, will double when incident angle, a, exceeds $a_1$, because twice as many hemispherical irregularities will be reflecting light at this angle. Each time a new irregularity reflects light at angle a, the intensity will increase in a stair step manner, as is shown in FIG. 17. The number of the hemispherical surface irregularities, n, illuminated by the incident beam can estimated by counting the number of stair steps, and thus can the sizes of the hemispherical surface irregularities be estimated using Equation 2.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for determining the planarity of a surface of an opaque material, the method comprising:
   directing light at an incident angle with respect to the surface of the opaque material;
   measuring the intensity of the light reflected from the opaque material at a plurality of angles of reflection;
   determining that the surface of an opaque material is planar when the measured intensity of the light reflected at an angle of 180 degrees less the angle of incidence is greater than zero and the measured intensity of the light reflected at all other angles of reflections of said plurality of angles of reflection are about zero.

2. A method for determining the planarity of a surface of an opaque material, the method comprising:
   directing ultraviolet light at an incident angle with respect to the surface of the opaque material;
   positioning a UV reflectometer over the surface of the opaque material and measuring the intensity of the UV light reflected at a plurality of angles of reflection;
   determining that the surface of an opaque material is planar when the intensity of the UV light measured by the UV reflectometer at an angle of 180 degrees less the angle of incidence is substantially greater than the intensity of the UV light measured by the UV reflectometer at all other angles of reflections of said plurality of angles of reflection.

3. A method for determining whether a planar surface of an opaque material has a prismatic irregularity thereon, the method comprising:
   directing light at an incident angle with respect to the planar surface of the opaque material;
   graphically plotting a measured intensity of the light reflected from the opaque material at a plurality of angles of reflection;
   determining that the planar surface of the opaque material has a prismatic irregularity thereon when the graphical plot of the measured intensity of the light reflected from the opaque material for the plurality of angles of reflection has a first non-zero measured intensity at a first angle of reflection and a second non-zero measured intensity at a second angle of reflection and wherein the measured intensity of the light reflected at all other angles of the plurality of angles of reflection is approximately zero.

4. The method as defined in claim 3, wherein the first angle of reflection is equal to 180 degrees less the angle of incidence, and the second angle of reflection is equal to about 180 degrees less the angle of incidence less twice an angle that a surface of the prismatic irregularity makes with the planar surface of the opaque material.

5. A method for determining whether a planar surface of an opaque material has a plurality of prismatic irregularities thereon, the method comprising:
   directing light at an incident angle with respect to the planar surface of the opaque material;
   graphically plotting a measured intensity of the light reflected from the opaque material at a plurality of angles of reflection;
   determining that the planar surface of the opaque material has a plurality of prismatic irregularities thereon when the graphical plot of the measured intensity of the light reflected from the opaque material for the plurality of angles of reflection has a pluralities of peaks, wherein:
   one of said plurality of peaks occurs at a first angle of reflection equal to 180 degrees less the angle of incidence;
   the other of said plurality of peaks occur at respective angles of reflection equal to 180 degrees less the angle of incidence less twice an angle that a surface of each respective prismatic irregularity makes with the planar surface of the opaque material;
   and the measured intensity of the light reflected at all other angles of the plurality of angles of reflection are substantially less than that of said plurality of peaks.

6. The method as defined in claim 5, wherein:
   directing light at the incident angle with respect to the planar surface of the opaque material illuminates an area, A;
   n is the number of peaks in said pluralities of peaks, the method further comprising:
   measuring $I_i$, the integrated intensity of the other of said plurality of peaks;
   measuring $I_T$, the integrated intensity of all reflected light; and
   calculating the average size of said plurality of prismatic irregularities as being equal to $A/(n-1)*(I_i/I_T)$.

7. The method as defined in claim 6, wherein:
   both $I_i$ and $I_T$ are measured with the incident angle of about 90 degrees; and
   both area A and the other of said plurality of peaks are measured with an incident angle less than 90 degrees.

8. The method as defined in claim 5, wherein:
   directing light at the incident angle with respect to the planar surface of the opaque material illuminates an area, A with an incident beam having a width, $W_B$;
   the incident angle is a; and
   $A=W_B/\cos(a)$.

9. A method for determining whether a planar surface of an opaque material has a prismatic irregularity thereon, the method comprising:
   directing light at an incident angle with respect to the planar surface of the opaque material;
   graphically plotting a measured intensity of the light reflected from the opaque material at a plurality of angles of reflection;
   determining that the planar surface of the opaque material has a prismatic irregularity thereon when the graphical plot of the measured intensity of the light reflected for the plurality of angles of reflection has a first and a second peak, wherein:
   the first peak occurs at a first angle of reflection equal to 180 degrees less the angle of incidence;
   the second peak occurs at a second angle of reflection equal to 180 degrees less the angle of incidence less twice an angle that a surface of the prismatic irregularity makes with the planar surface of the opaque material;
   and the measured intensity of the light reflected at all other angles of the plurality of angles of reflection are substantially less than that of the first and second peaks.

10. A method for determining whether a planar surface of an opaque material has a prismatic irregularity thereon using a UV reflectometer, the method comprising:
    directing ultraviolet light at an incident angle with respect to the planar surface of the opaque material;
    measuring the intensity of the UV light reflected from the opaque material at a plurality of angles of reflection using a UV reflectometer;

graphically plotting the intensity of the UV light reflected from the opaque material by the UV reflectometer at each angle of reflection;

determining that the planar surface of the opaque material has a prismatic irregularity thereon when the graphical plot has a first and a second peak, wherein:

the first peak occurs at a first angle of reflection equal to 180 degrees less the angle of incidence;

the second peak occurs at a second angle of reflection equal to 180 degrees less the angle of incidence less twice an angle that a surface of the prismatic irregularity makes with the planar surface of the opaque material;

and the measured intensity of the UV light reflected at all other angles of the plurality of angles of reflection is substantially less than that of the first and second angles.

11. A method for determining whether a planar surface of an opaque material has a hemispherical irregularity thereon, the method comprising:

directing light from a light source at an incident angle with respect to the planar surface of the opaque material;

graphically plotting a measured intensity of the light reflected from the opaque material at a plurality of angles of reflection;

determining that the planar surface of the opaque material has a hemispherical irregularity thereon when the graphical plot of the measured intensity of the light reflected from the opaque material for the plurality of angles of reflection has a first and a second peak, wherein:

the first peak occurs at about 180 degrees less the angle of incidence;

the second peak occurs at about the angle of incidence;

and the measured intensity of the light reflected at all other angles of the plurality of angles of reflection are non-zero.

12. The method as defined in claim 11, further comprising measuring the intensity of the light reflected directly back at the light source as $I_o$, wherein:

a is the angle of incidence;

r is the angle of reflection at the second peak; and the measured intensity of the light reflected from the opaque material for the second peak is equal to $I_0 \cos(r/2-a/2)$.

13. The method as defined in claim 11, further comprising measuring the intensity of the light reflected directly back at the light source as $I_o$, wherein:

a is the angle of incidence;

r is the angle of reflection;

$I_r$ is the intensity of the light reflected at said angle of reflection r, and $I_r = I_0 \cos(r/2-a/2)$.

14. A method for determining whether a planar surface of an opaque material has a hemispherical irregularity thereon using an ultraviolet (UV) reflectometer, the method comprising:

directing UV light at an incident angle with respect to the planar surface of the opaque material;

measuring the intensity of the UV light reflected from the opaque material at a plurality of angles of reflection using a UV reflectometer;

graphically plotting the intensity of the UV light reflected from the opaque material by the UV reflectometer at each angle of reflection;

determining that the planar surface of the opaque material has a hemispherical irregularity thereon when the graphical plot of the measured intensity of the UV light reflected from the opaque material for the plurality of angles of reflection has a first and a second peak, wherein:

the first peak occurs at about 180 degrees less the angle of incidence;

the second peak occurs at about the angle of incidence;

and the measured intensity of the light reflected at all other angles of the plurality of angles of reflection are non-zero.

* * * * *